United States Patent [19]
Setani

[11] Patent Number: 5,221,835
[45] Date of Patent: Jun. 22, 1993

[54] IMAGE READING APPARATUS HAVING A REFLECTIVE BLAZED DIFFRACTION GRATING WITH VARIED PITCH

[75] Inventor: Michitaka Setani, Kawasaki, Japan
[73] Assignee: Canon Kabushiki Kaisha, Tokyo, Japan
[21] Appl. No.: 894,516
[22] Filed: Jun. 4, 1992
[30] Foreign Application Priority Data
  Jun. 7, 1991 [JP] Japan .................. 3-163643
  Jun. 19, 1991 [JP] Japan .................. 3-174390
[51] Int. Cl.$^5$ ............................................. H01J 40/14
[52] U.S. Cl. .................................. 250/208.1; 359/571
[58] Field of Search ................... 250/208.1, 208.2, 216, 250/237 R, 226; 359/571, 572, 573

[56] References Cited
U.S. PATENT DOCUMENTS
  4,277,138  7/1981  Dammann ..................... 350/162
  5,113,067  5/1992  Nakai et al. .................... 250/208.1
  5,162,943  11/1992 Komats et al. .................. 359/571

Primary Examiner—David C. Nelms
Attorney, Agent, or Firm—Fitzpatrick, Cella, Harper & Scinto

[57] ABSTRACT

A color reading apparatus includes a reflection type one dimensional blazed diffraction grating for color separation which is provided on an optical path between an imaging optical system for focusing a color image on a photosensor, and the photosensor in which three line sensors are disposed on a common substrate. The pitch of the diffraction grating varies in a direction of the pitch so as to control the reflective diffraction angle from reflection points resulting from different incident angles on the diffraction grating and to prevent the occurrence of a blur of ±1st-order diffracted light in the pitch cross section on the diffraction grating.

12 Claims, 14 Drawing Sheets

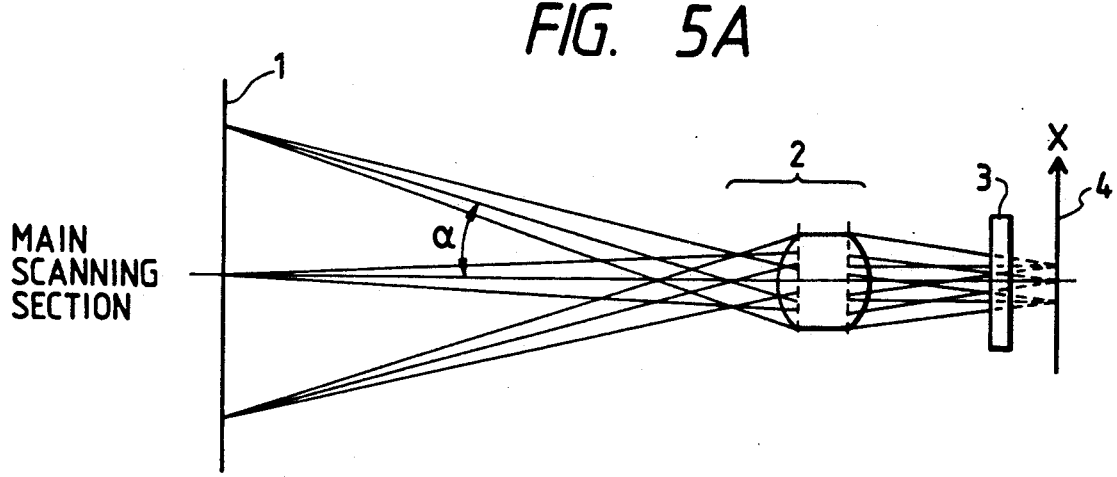
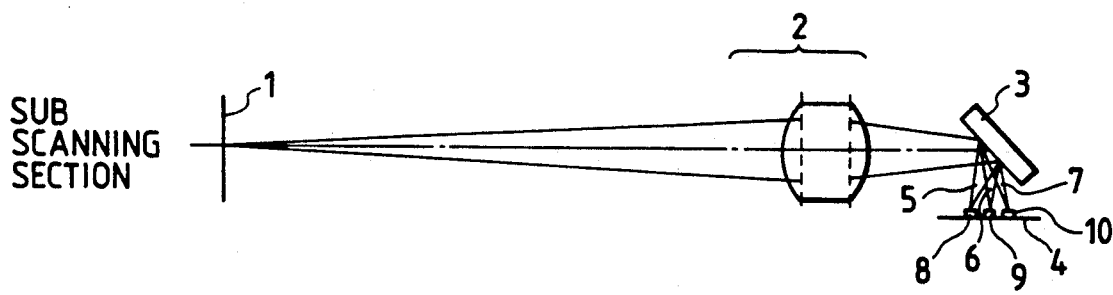
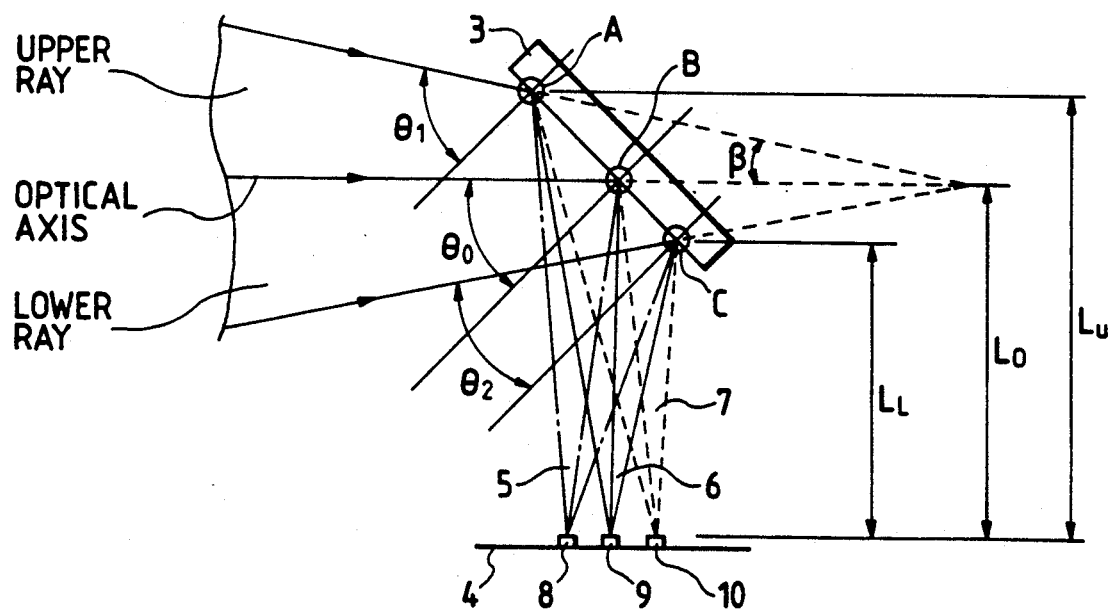

ENLARGEMENT OF PORTION "A"

ENLARGEMENT OF PORTION "C"

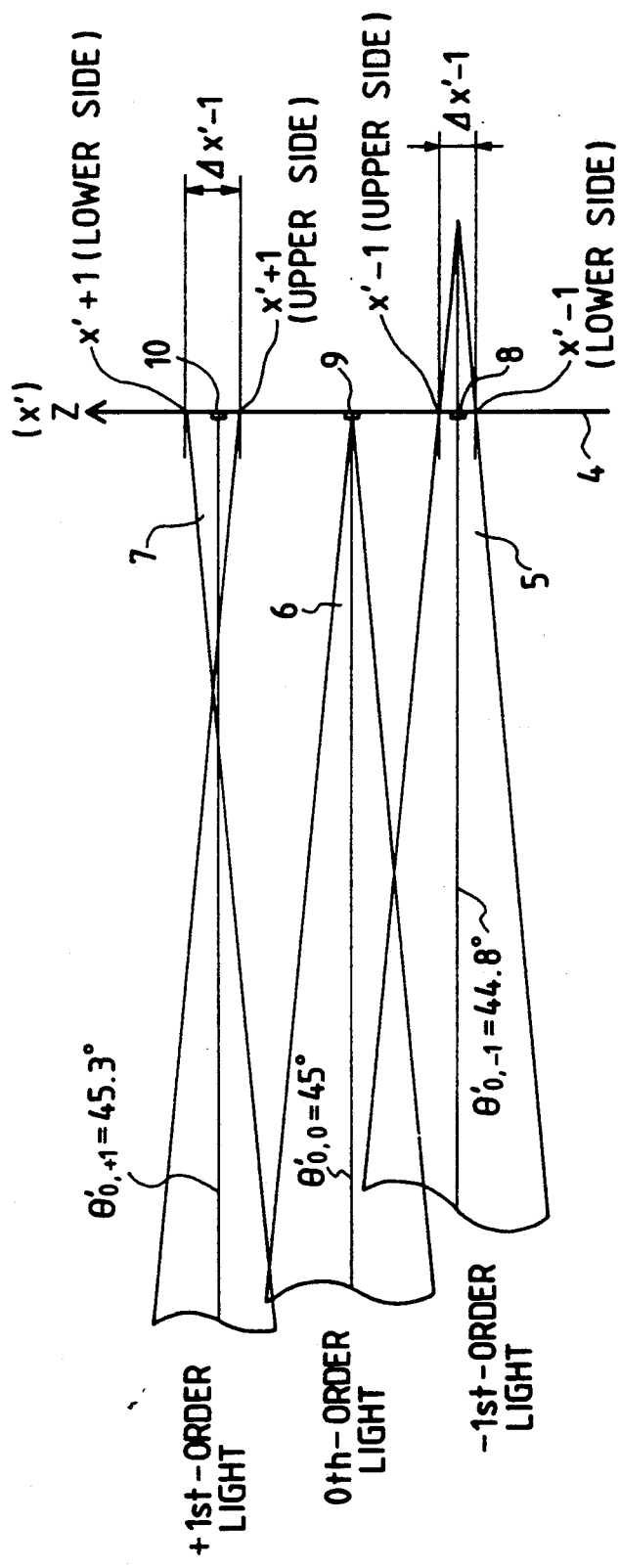

FIG. 9
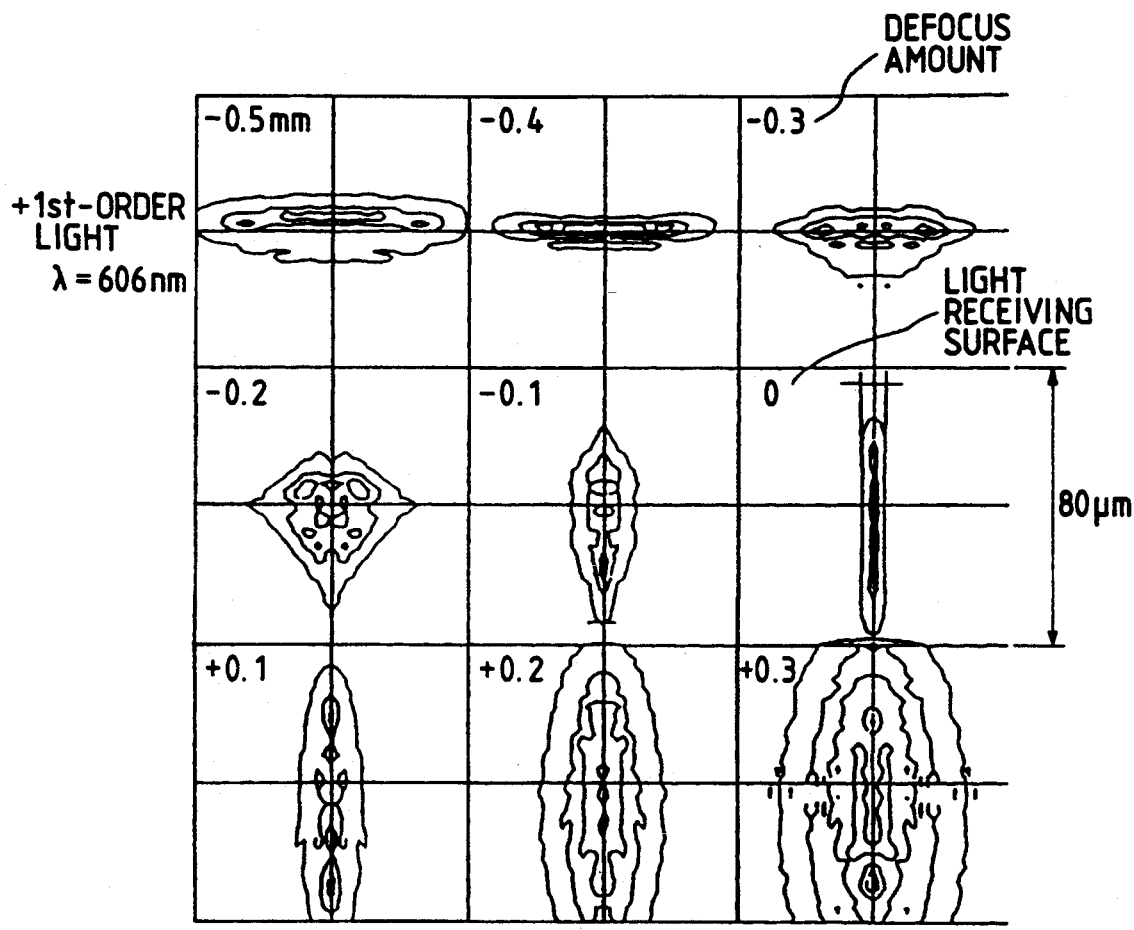
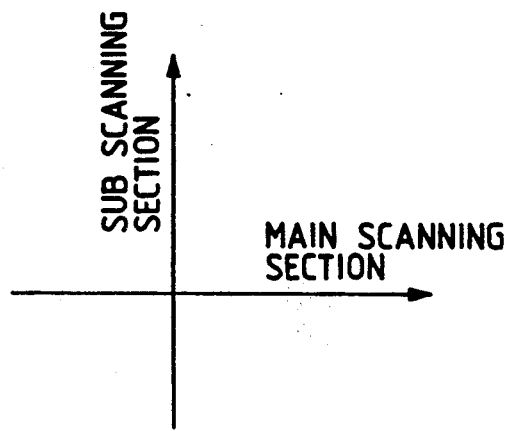

Pc < Pe, hc < he

IMAGE READING APPARATUS HAVING A REFLECTIVE BLAZED DIFFRACTION GRATING WITH VARIED PITCH

BACKGROUND OF THE INVENTION

1. Field of the Invention

The present invention relates to a color image reading apparatus, and more particularly to a color image reading apparatus provided with color separation means comprising a one-dimensional reflective blazed diffraction grating, and light receiving means including three line sensors (photosensors) mounted on the same substrate, capable of preventing image blur on the photosensors resulting from aberration in the reflective diffraction angle caused by a difference in the incident light angle thereby enabling to read color image information of an original image with a high precision, and adapted for use in a color scanner, a color facsimile apparatus or the like.

2. Description of Related Art

There have been proposed various apparatuses for focusing the color image information of an original image onto line sensors (CCD) through an optical system and reading the color image information in digital manner, utilizing the output signals of said line sensors.

As an example, FIG. 1 schematically illustrates the optical system of a conventional color image reading apparatus, wherein the light from a color image on an original image plane 11 is condensed by an imaging lens 19, then split into three colors, for example red (R), green (G) and blue (B) by a 3P prism 20, and guided to respective line sensors 21, 22, 23, and the color images focused on said line sensors are respectively read by scanning in the sub-scanning direction.

FIG. 2 also illustrates schematically the optical system of another conventional color image reading apparatus, wherein the light from a color image on the original image plane 11 is condensed by an imaging lens 29, and is split into three light beams corresponding to three colors, by beam splitters 30, 31 with dichroic transmission films, and said three color beams are respectively focused on three line sensors, formed on so-called monolithic 3-line sensor 32 and are respectively read by scanning in the sub-scanning direction.

FIG. 3 is a schematic perspective view of the monolithic 3-line sensor 32 shown in FIG. 2. Said sensor 32 is provided with three line sensors (CCD's) 25, 26, 27 arranged in a mutually parallel manner and with a certain mutual distance, on a same substrate, and said line sensors are respectively provided thereon with unrepresented color filters corresponding to the colors of the light beams.

The distances S1, S2 of said line sensors 25, 26, 27 are generally in a range of 0.1–0.2 mm based on various conditions of preparation, and the pixel sizes W1, W2 of each single element is for example in a range of 7×7 to 10×10 μm.

The color image reading apparatus shown in FIG. 1 is complex and expensive as it requires not only three independent line sensors but also a 3P prism which necessitates a high precision and is difficult to manufacture. Also the assembling and adjustment are cumbersome since the alignment between the light beams and the line sensors has to be made three times independently.

Also in the color image reading apparatus shown in FIG. 2, the distance between the line sensors is represented by $2\sqrt{2}t$, for a plate thickness t of the beam splitters 30, 31. Thus, for a distance of 0.1 to 0.2 mm, which is preferred for the manufacture of line sensors, the plate thickness t for the beam splitters 30, 31 has to be in a range of 35 to 70 μm.

It is in general very difficult to produce a beam splitter of a satisfactory optical flatness with such a small thickness, and the color image focused on the line sensors becomes inevitably deteriorated when beam splitters of such a small thickness are employed.

On the other hand, in the monolithic 3-line sensor, the distances S1, S2 of the lines 25, 27 from the central line 26, as shown in FIG. 4, are generally selected as mutually equal and as an integral multiple of the pixel size W2 (cf. FIG. 3) in the sub-scanning direction, for the following reason.

In case of reading a color image with the above-mentioned monolithic 3-line sensor through an ordinary imaging optical system 45 as shown in FIG. 4, three line sensors 25, 26, 27 read three different positions 25', 26', 27' on the original image plane 11 at the same time.

Stated differently, the three-color (R, G, B) signal components of a given position on the original image plane 11 cannot be read simultaneously but have to be obtained by time adjustments after signal reading with three line sensors.

More specifically, three color signal components can be relatively easily obtained by selecting the distances S1, S2 of the three line sensors as an integral multiple of the pixel size W2, and for example delaying the G, R signals (corresponding to the lights of green and red colors) with respect to the B signal (corresponding to the light of blue color) by means of redundant line memories.

For this purpose, the distances S1, S2 of the line sensors 25, 27 from the central line sensor 26 are selected as an integral multiple of the pixel size W2 in the sub-scanning direction.

However, in such a color image reading apparatus, for providing the redundant line memories corresponding to the gaps in the three line sensors, there are required plural units of expensive line memories. Such configuration is extremely disadvantageous in cost, and also complicates the entire device.

Also there is known, as disclosed in the U.S. Pat. No. 4,277,138 a color image reading device employing a blazed diffraction grating as the color separation means, instead of dichroic mirrors.

However, the disclosed configuration is only designed for the light coming from a point in the object, and does not consider so-called image angle characteristics arising from a fact that the object has a finite reading width in the main scanning direction.

SUMMARY OF THE INVENTION

The object of the present invention is, in reading a color image by color separation with a reflective one-dimensional blazed diffraction grating, to suitably modify the grating pitch of said diffraction grating on the grating plane in order to control the reflective diffraction angles from the reflection points of different incident angles on said diffraction grating and to effectively prevent image blur caused by ±1st order diffracted lights on the photosensors in the cross-sectional direction of the grating pitch, thereby providing a color image reading apparatus capable of digitally reading a color image with a high precision, by means of lights of three colors, for example R, G and B.

The color image reading apparatus of the present invention is featured, in focusing a color image by an imaging optical system onto photosensor means including three line sensors on a same, or common, substrate and reading said color image with said photosensor means, by the presence, in the optical path between said imaging optical system and said photosensor means, of color separation means comprising a reflective one-dimensional blazed diffraction grating for separating the incident light beam into three color light beams, and by a fact that the pitch of said blazed diffraction grating varies in continuous manner in the direction of pitch.

It is also featured by facts that said three line sensors are provided in a mutually parallel manner, that said imaging optical system is composed of a telecentric system at the exit side, and that said color separation means color-separates the incident light beam in a direction perpendicular to the direction of array of pixels in said line sensors.

It is furthermore featured by a fact that the pitch of said reflective one-dimensional blazed diffraction grating is continuously increased or decreased from a peripheral area in the sub-scanning cross section, and is continuously increased from the center of the optical axis of said imaging optical system to the peripheral part in the image angle thereof.

It is furthermore featured by a fact that the grating thickness of said blazed diffraction grating increases in succession from the optical axis center of said imaging optical system to the peripheral part in the image angle thereof.

Furthermore, the color image reading apparatus of the present invention is featured, in focusing a color image by an imaging optical system onto photosensor means including three line sensors on a same substrate and reading said color image with said photosensor means, by the presence, in the optical path between said imaging optical system and said photosensor means, of color separation means comprising of a reflective one-dimensional blazed diffraction grating for color-separating the incident light beam into three color light beams, and the presence, between said color image and said photosensor means, of light amount correction means for controlling the amount of transmitted light in such a manner that the numerical aperture in the sub-scanning direction becomes smaller than that in the main scanning direction.

BRIEF DESCRIPTION OF THE DRAWINGS

FIGS. 5A and 5B are respectively a plan view and a lateral view of the optical system of a first embodiment of the color image reading apparatus of the present invention;

FIG. 6 is a partial view of the optical path after the imaging optical system shown in FIGS. 5A and 5B;

FIG. 8 is a chart showing optical paths of the reflective diffracted lights of different orders of diffraction toward the 3-line sensor;

FIG. 9 is a view showing the diffraction pattern of a $\pm$1st order light;

DETAILED DESCRIPTION OF THE PREFERRED EMBODIMENTS

Figure 1:
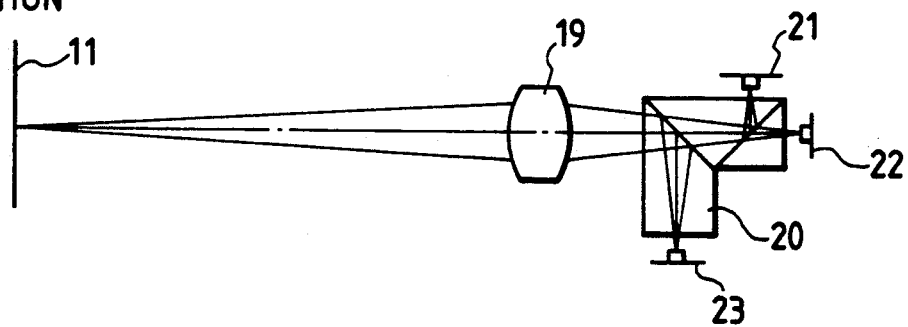
FIG. 1 is a partial schematic view of the optical system of a conventional color image reading apparatus.
Figure 2:
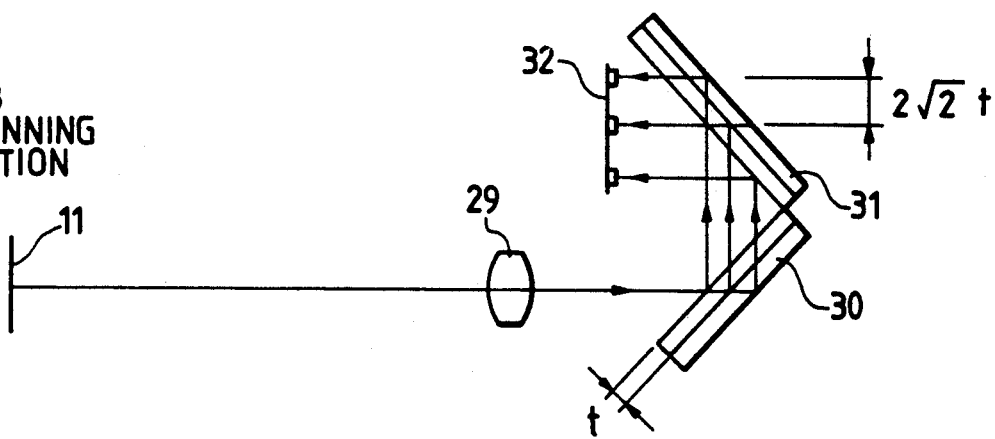
FIG. 2 is a partial schematic view of the optical system of another conventional color image reading apparatus.
Figure 3:
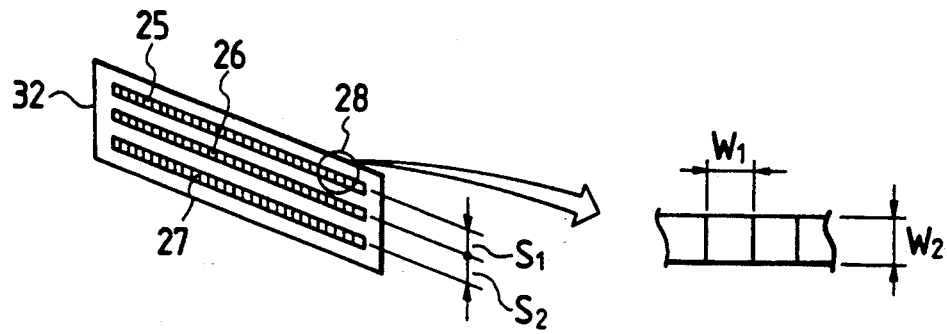
FIG. 3 is a schematic view of a monolithic 3-line sensor.
Figure 4:
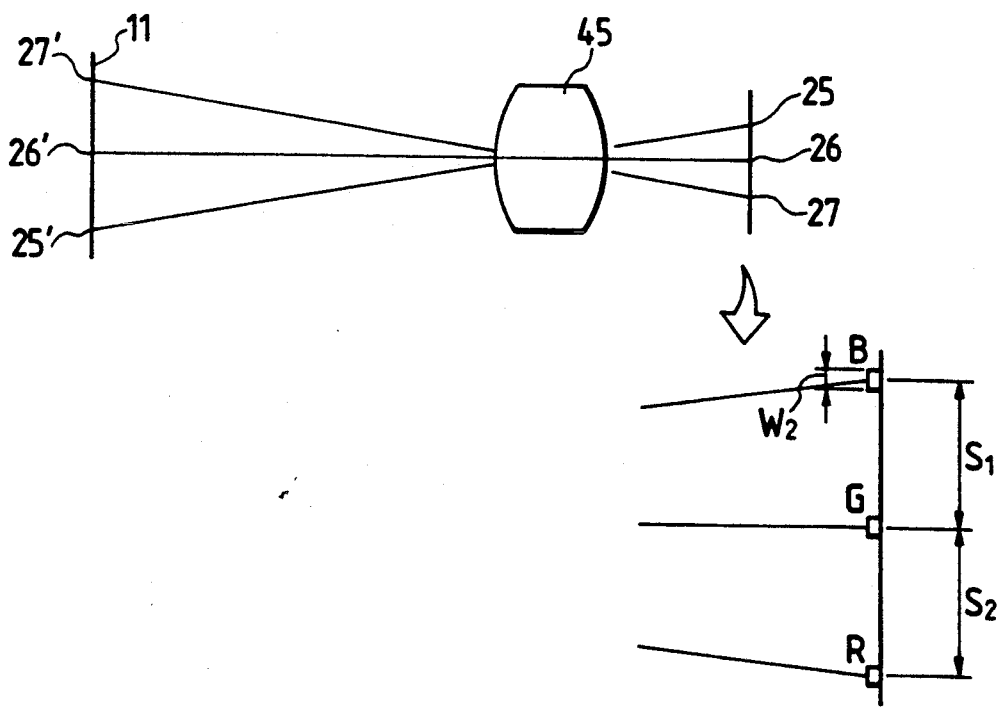
FIG. 4 is a partial schematic view of the optical system of a conventional color image reading apparatus.

FIGS. 5A and 5B are respectively a plan view along the main scanning cross section and a lateral view along the sub-scanning cross section, perpendicular to said main scanning cross section, of a first embodiment of the color image reading apparatus of the present invention.

FIG. 6 is a partial view showing the optical path after the imaging optical system shown in FIGS. 5A and 5B, and FIGS. 7A and 7B are partial magnified views of the reflective one-dimensional blazed diffraction grating shown in FIG. 6.

In these drawings, an original image plane 1 bears a color image constituting an object. An imaging optical system 2 is constructed, in the present embodiment, as so-called exit telecentric system in which the principal ray at the exit side emerges parallel to the optical axis, and focuses a light beam, coming from said color image, onto photosensor means (monolithic 3-line sensor) through a reflective one-dimensional blazed diffraction grating to be explained later.

Color separation means 3 is composed of said reflective one-dimensional blazed diffraction grating, of which a grating pitch is continuously increased or decreased in the direction of pitch (sub-scanning direction). Said blazed diffraction grating 3 separates the incident light beam, by reflective diffraction, into the lights of predetermined colors, for example three elementary colors of red (R), green (G) and blue (B), in a direction perpendicular to the direction of array of pixels of the line sensors.

Photosensor means 4 is composed of so-called monolithic 3-line sensor, having three line sensors (CCD's) 8, 9, 10 arranged in a mutually parallel manner on a same substrate. Said line sensors 8, 9, 10 are respectively provided with color filters (not shown) corresponding to the incident color lights, and the distances of said line sensors are selected at different values corresponding to the directions of separated lights obtained from the color separation means 3.

In the present embodiment, the color image on the original image plane 1 is line scanned in the sub-scanning direction by scanning means composed for example of an unrepresented scanning mirror, and the light beam obtained from said color image is condensed by the imaging optical system 2, then separated by the one-dimensional blazed diffraction grating 3 into lights of three colors, which are respectively focused on the line sensors 8, 9, 10, and color image signals are obtained in a digital manner by the photosensor means 4.

Thus the image information on the original image plane 1 is read by mutual movement, in the sub-scanning direction, between the original image plane 1 and the image reading device (imaging optical system 2, one-dimensional blazed diffraction grating 3 and photosensor means 4).

On the photosensor means 4, the sensor arrays 8, 9, 10 extend in the main scanning direction, represented as X-direction in the drawing. Said photosensor means 4 is constructed as a monolithic 3-line sensor in which three one-dimensional sensor arrays are formed on a same substrate, with finite distances therebetween in a direction perpendicular to the direction of arrays.

The one-dimensional blazed diffraction grating 3 is provided in the optical path between the imaging optical system 2 and said photosensor means 4, and serves to separate the light from the object into lights of a plurality of colors and to guide the separated lights to the respectively corresponding sensor arrays.

The original image plane 1 is illuminated by an unrepresented light source.

The one-dimensional blazed diffraction grating 3 separates the light from the objects in the sub-scanning direction, which is perpendicular to the direction of arrays.

As shown in FIG. 6, the blazed diffraction grating 3 of the present embodiment separates the reflection diffracted light into three directions, namely into a $-1$st order light 5, a 0th order light 6 and a $\pm 1$st order light 7, and focuses said lights, as beams of a converging spherical wave formed by the imaging optical system 2, respectively on the line sensors 8, 9, 10.

In the following there will be explained image blur in a case where a converging light beam enters the reflective one-dimensional diffraction grating.

In the cross section along the direction of grating pitch (or in the sub-scanning cross section shown in FIGS. 5B and 6), among the converging spherical wave, a light beam entering the diffraction grating 3 from the upper side of the drawing (hereinafter called "upper ray"), a light beam entering the diffraction grating 3 along the optical axis, and a light beam entering the diffraction grating 3 from the lower side of the drawing (hereinafter called "lower ray") have respectively different incident angles relative to said diffraction grating 3.

The incident angles $\theta_1$, $\theta_0$, $\theta_2$ respectively of the upper ray, axial ray and lower ray satisfy a relation $\theta_1 > \theta_0 > \theta_2$.

The 1st order reflected diffraction angle $\theta'$ is related with the incident angles $\theta$ in the following manner:

$$\sin\theta' - \sin\theta = \pm \lambda/P$$

wherein $\lambda$ is wavelength; P is grating pitch; and the sign $+$ or $-$ respectively stands for $\pm 1$st order or $-1$st order diffraction.

Consequently, the reflected diffraction angle $\theta'$ can be determined by:

$$\theta' = \sin^{-1}(\pm \lambda/P + \sin\theta) \tag{1}$$

Said reflected diffraction angle $\theta'$ varies for different rays in the aforementioned sub-scanning cross section. Consequently, when a one-dimensional blazed diffraction grating is positioned in the converting spherical wave formed by the imaging optical system, there will result, on the image plane (photosensor means), a blur corresponding to the aberration in the reflected diffraction angles $\theta'$ of the diffracted lights of different orders.

In the following the above-mentioned example, in which the incident angle $\theta_0$ of the axial ray is 45°, and the numerical aperture NA of the incident light beam of the converging spherical wave to the one-dimensional blazed diffraction grating is defined by $NA = \sin\beta$. There are also assumed conditions of a converging angle $\beta$ of the converging spherical wave of 5.5°, a grating pitch P of 160 μm, and an axial distance $L_0$ of 35.2 mm from the diffraction grating to the photosensor (three line sensors). Under these conditions and for the $\pm 1$st order diffracted light of a wavelength $\lambda_{+1} = 606$ nm, the upper ray has an incident angle $\theta_1 = 50.5°$ and a reflected diffraction angle $\theta'_{1,+1} = 50.8°$; the lower ray has an incident angle $\theta_2 = 39.5°$ and a reflected diffraction angle $\theta'_{2,+1} = 39.8°$; and the axial ray has an incident angle $\theta_0 = 45°$ and a reflected diffraction angle $\theta'_{0,+1} = 45.3°$.

FIG. 8 shows the optical paths of $\pm 1$st and 0th order reflected diffraction lights to the surface of the 3-line sensor 4.

As will be apparent from FIG. 8, the upper and lower rays show a certain aberration in this cross section. The $\pm 1$st order light converge in front of the face of the 3-line sensor 4, thus generating a blur of about 75 μm on said photosensor.

Similarly the $-1$st order diffracted light with a wavelength $\lambda_{-1} = 471$ nm generate a blur. The upper and lower rays of the $-1$st order diffracted lights converge behind the face of the 3-line sensor 4, thus generating a blur of 58 μm on said sensor in geometrical optics.

On the other hand, the 0th order diffracted light does not generate such image blur, since the reflective one-dimensional blazed diffraction grating merely functions as a mirror surface.

The reflective one-dimensional blazed diffraction grating employed in the above-mentioned numerical example has a grating thicknesses $d_1 = d_2 = d_3 = 749.5$ nm, step widths $W_1 = W_2 = W_3 = W_4$ and a pitch P represented by:

$$P = \sum_{\lambda=1}^{4} W_i$$

Also the efficiency peak wavelengths λ for the diffracted lights of different orders are determined, for the ±1st order lights, by:

$$2d \cdot \cos\theta_0 = (m \mp 1/n) \cdot \lambda_{\pm 1}$$

wherein (n, m) = (4, 2) so that $\lambda_{+1} = 606$ nm and $\lambda_{-1} = 471$ nm, and for the 0th order light, by:

$$2d \cdot \cos\theta_0 = m \cdot \lambda_0 \qquad (2)$$

so that $\lambda_0 = 530$ nm.

Figure 10:
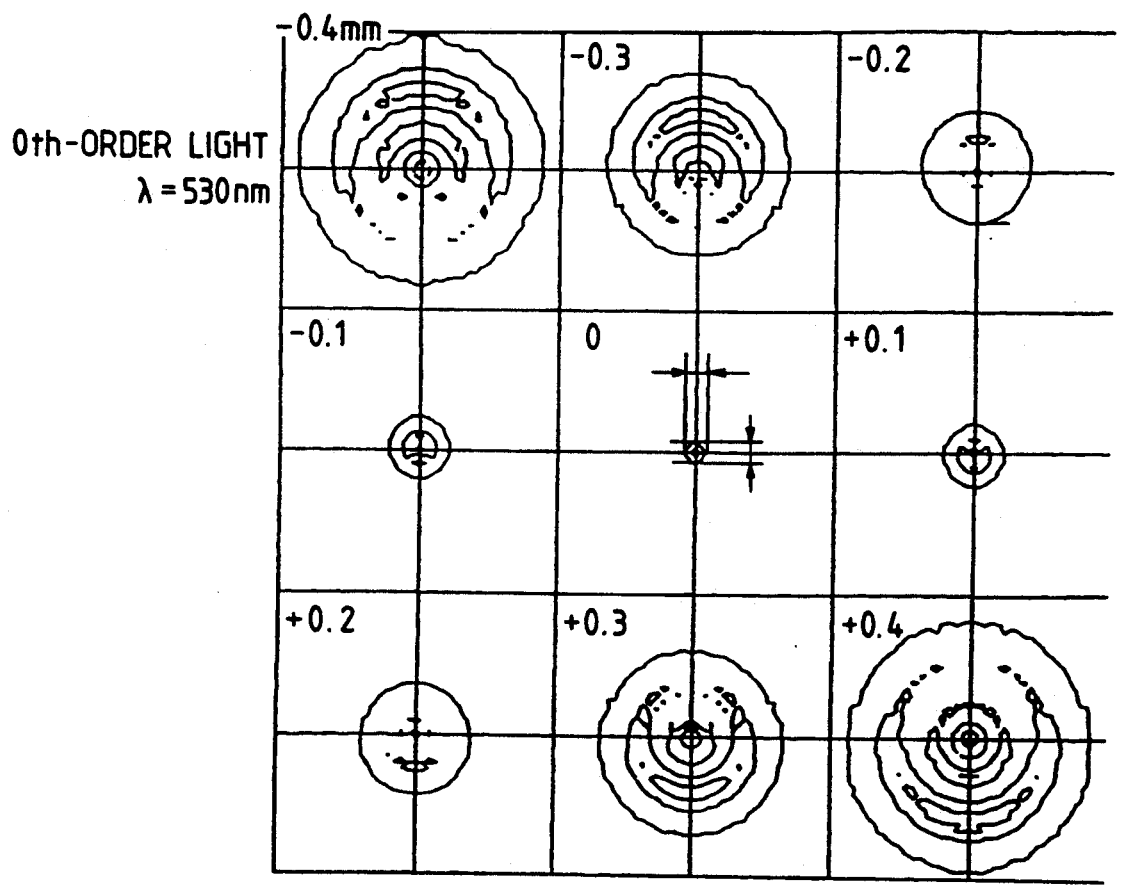
FIG. 10 is a view showing the diffraction pattern of a 0th order light.
Figure 11:
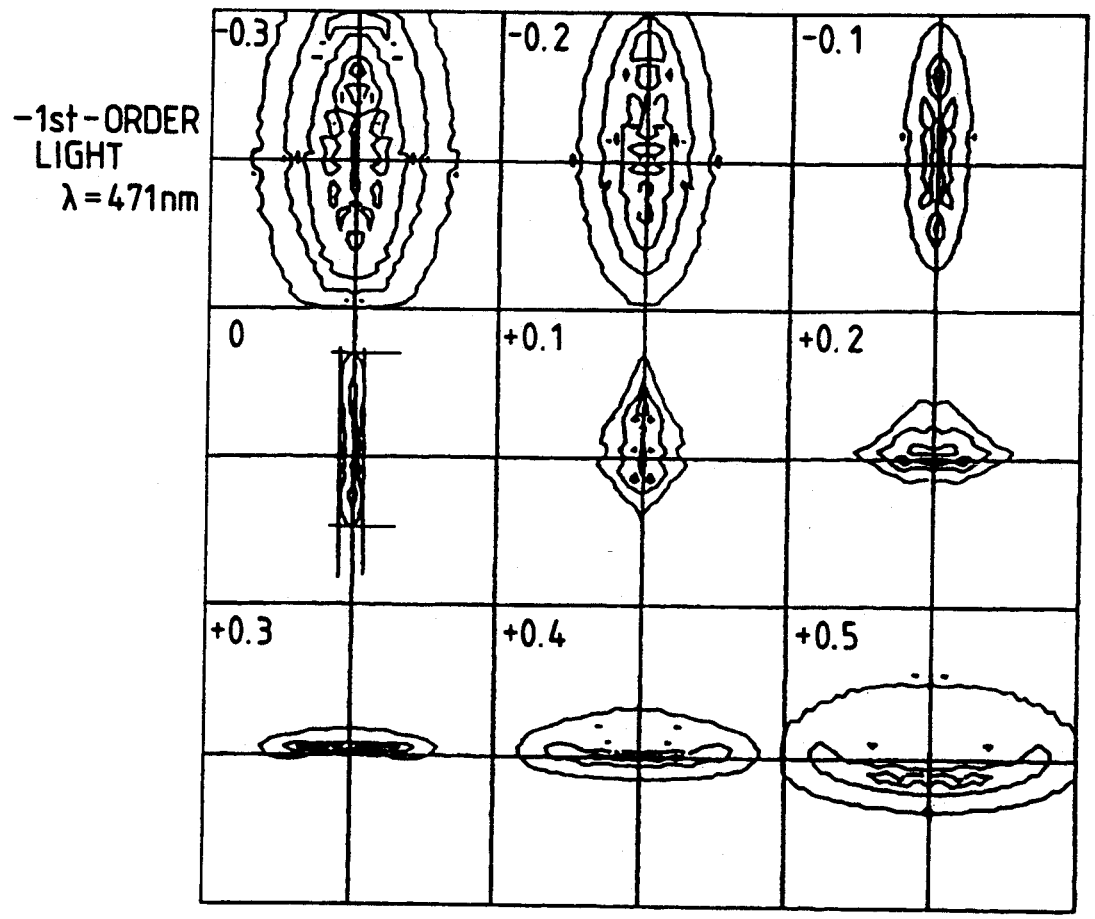
FIG. 11 is a view showing the diffraction pattern of a $-$1st order light.

The above-mentioned amounts of blur are obtained by geometrical optics, but the point image intensity distributions based on simulations by stricter Kirchhoff diffraction are shown in FIGS. 9 to 11. As will be shown in these drawings, the amounts of blur in both methods mutually coincide in a relatively satisfactory manner.

In general, for reading color image information with high precision in a color image reading apparatus, the above-mentioned blur cannot be tolerated as it deteriorates the resolving power in the sub-scanning direction in the image reading.

In the present invention, in order to resolve the above-mentioned drawback, the grating pitch of said one-dimensional blazed diffraction grating is continuously decreased from one peripheral portion to the other peripheral portion, i.e. from the upper end of said grating to the lower end in the drawing, thereby controlling the reflective diffraction angles at the different reflection points, in such a manner that all the light beams, subjected to being reflectively diffracted on said blazed diffraction grating, are properly focused on the photosensors.

In this manner the blur is effectively prevented on the photosensor face, caused by the aberration in the reflected diffraction angles θ′, resulting from different incident angles θ to the reflective one-dimensional blazed diffraction grating.

More specifically, in the foregoing numerical example, in order to focus the ±1st order light of the wavelength $\lambda_{+1}$ of 606 nm, with the reflected diffraction angle $\theta'_{1,+1} = 50.8°$ for the upper ray, onto the 3-line sensor without image blur, said angle $\theta'_{1,+1}$ has to be 50.75°, so that the grating pitch P1 at this point has to be 198.5 μm.

Also in order to focus the lower ray, with the reflected diffraction angle $\theta'_{2,+1} = 39.8°$, onto the 3-line sensor without image blur, said angle $\theta'_{2,+1}$ has to be 39.86°, so that the grating pitch P2 at this point has to be 135.0 μm.

Figure 7A:
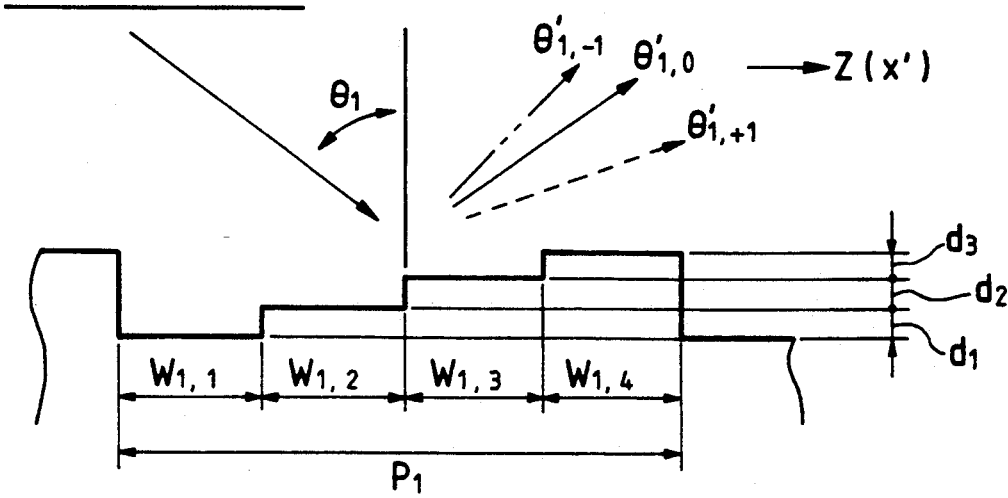
FIGS. 7A and 7B are partial magnified views of a reflective one-dimensional blazed diffraction grating shown in FIG. 6.
Figure 7B:
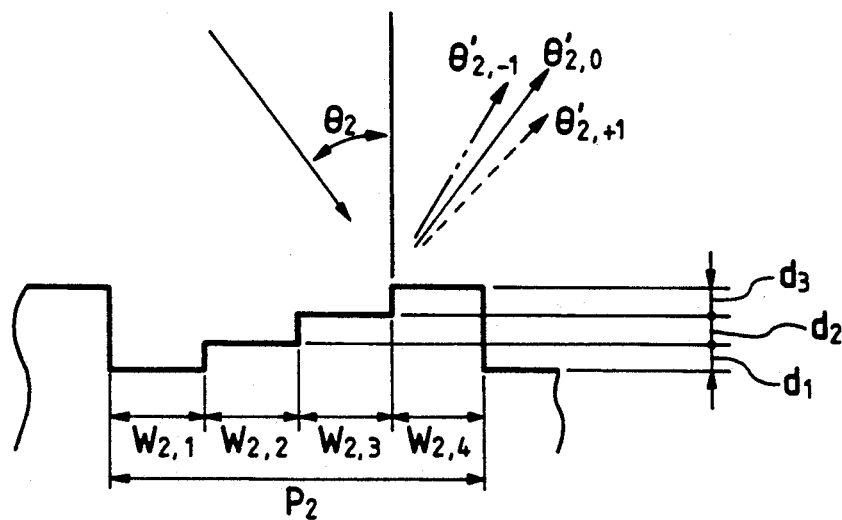

For this reason, in the present first embodiment, the grating pitch is decreased continuously from the upper side to the lower in such a manner that, as shown in FIG. 7A, the grating pitch P1 at an upper position A is 198.5 μm and that P0 on the axial position B is 160 μm, and as shown in FIG. 7B, the grating pitch P2 at a lower position C is 135.0 μm. In this manner all the light beams coming from the color image and passing through the imaging optical system 2 are properly focused on the photosensor, without generating blur.

In the present embodiment, as explained in the foregoing, in the color separation of a converging light beam by a reflective one-dimensional blazed diffraction grating, the grating pitch in the sub-scanning cross section (in which the light beam is color separated) is selected larger in a portion (A) where the incoming beam has a larger incident angle and smaller in a portion (C) where the incoming beam has a smaller incident angle.

Although the foregoing description has been limited to the ±1st order light, the above-explained variation in the grating pitch has a similar effect of the −1st order light with a wavelength $\lambda_{-1} = 471.1$ nm.

In the following there will be explained the features of the reflective one-dimensional blazed diffraction grating of the present embodiment, particularly in comparison with a transmissive one-dimensional brazed diffraction grating.

As discussed in Applied Optics, 17, 15, p. 2273–2279 (Aug. 1, 1978), the transmissive diffraction grating separates the incident light beam principally into three directions by transmissive diffraction. For a blazed wavelength $\lambda_0$, such transmissive diffraction grating requires a grating thickness $d_T = m \cdot \lambda_0 (n_{\lambda 0} - 1)$, wherein $n_{\lambda 0}$ is the refractive index of the medium. Calculated for m = 2, λ0 = 530 nm as in the foregoing embodiment and for a refractive index $n_{\lambda 0} = 1.5$, the transmissive diffraction grating requires a thickness $d_T = 2120$ nm.

On the other hand, the reflective one-dimensional blazed diffraction grating of the present invention (with an incident angle of 45° for the axial ray) has a grating thickness $d_R = 749.5$ nm as explained before. Consequently the transmissive grating requires a thickness $d_T$ about three times as large as the thickness $d_R$ of the reflective grating.

Such a large step imposes significant difficulty in the preparation of the diffraction grating. Although this difficulty is somewhat alleviated by the use of a medium of a higher refractive index, the medium for the one-dimensional blazed diffraction grating generally has a refractive index of about 1.5, such as $SiO_2$, in consideration of the working properties, cost and other factors.

Also in consideration of the efficiency of space utilization in the device, the reflective diffraction grating is advantageous as it easily allows compactization of the entire device.

Also in the present embodiment, the imaging optical system 2 is constructed as an exit telecentric system in the main scanning cross section, as shown in FIG. 5A, for the following reason.

In case the incident angle of the ray to the diffraction grating varies according to the field angle in the main scanning cross section, the blazed wavelength $\lambda_0$ varies according to the following equation:

$$m \cdot \lambda_0 = di \times \left[ \frac{1}{\cos\theta_0 \cdot \cos\alpha'} + \frac{1 - \tan^2\theta_0 - (\tan\alpha'/\cos\theta_0)^2}{\{1/\cos^2\theta_0 + (\tan\alpha'/\cos\theta_0)^2\}^{1/2}} \right]$$

More specifically, if a non-telecentric imaging optical system and a reflective one-dimensional blazed diffraction grating are employed for an incident angle $\alpha' = 20°$ in the main scanning cross-section, the brazed wavelength $\lambda_0$ is shifted by about 30 nm.

In order to avoid such shift, the imaging optical system in the present embodiment is made telecentric at the exit side, whereby the principal rays from the imaging optical system corresponding to different field angles always enter the one-dimensional blazed diffraction grating perpendicularly in the main scanning plane.

Figure 12:
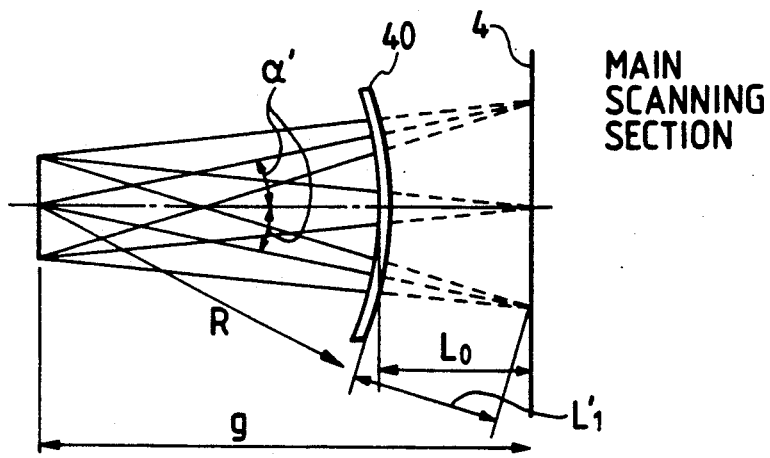
FIG. 12 is a partial schematic view of the optical system of a second embodiment of the color image reading apparatus of the present invention.

FIG. 12 is a partial schematic view of the optical system of a second embodiment of the image reading apparatus of the present invention, wherein the reflective one-dimensional blazed diffraction grating 40, serving as the color separation means, is constructed in a cylindrical form, so that an ordinary (non-telecentric) imaging optical system is employed. Also in this embodiment, the pitch of said diffraction grating 40 is continuously varied in the direction of pitch, as in the first embodiment.

Figure 13:
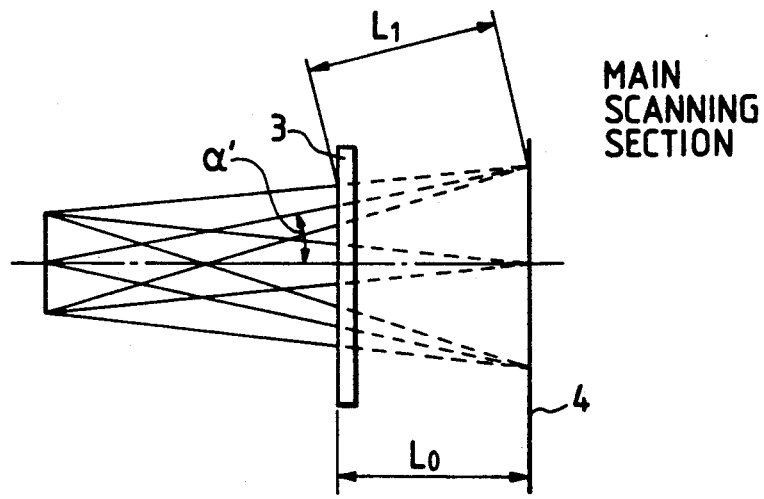
FIG. 13 is a partial schematic view for comparison with the configuration of the present invention.

Let us consider a ray entering the imaging optical system 2 with a field angle $\alpha$ and emerging therefrom with an emerging angle $\alpha'$. With a non-cylindrical reflective one-dimensional blazed diffraction grating as shown in FIG. 13, the optical path length of the ray which is reflectively diffracted by said grating to a line sensor 4 of the photosensor means is $L_0$ in the axial position, and $L_1$ in an off-axial position with an emerging angle $\alpha'$, wherein $L_1 = L_0/\cos\alpha'$. (It is to be noted that the optical paths are illustrated in broken-lined developed state in FIGS. 12 and 13, and that $\alpha \approx \alpha'$ in the ordinary optical system).

Thus, the optical path length between the diffraction grating and the photosensor is not constant but variable depending on the emerging angle $\alpha'$. (i.e. $\alpha' = 0$ for on-axis, $\alpha' \neq 0$ for off-axis)

The incident angle $\theta$ to the reflective one-dimensional blazed diffraction grating and the position (separation distance) Z on the photosensor in the sub-scanning direction are correlated by the following equation:

$$Z = L \cdot \tan\{\sin^{-1}(\pm\lambda/p + \sin\theta) - \theta\} \quad (4)$$

sing $+$: $\pm$1st order,
sign $-$: $-$1st order,
L: $L_0$ or $L_1$.

As represented by the equation (4), the position Z is not constant but varies according to the incident angle $\theta$ on the photosensor. Therefore, on each of the photosensor arrays arranged in parallel manner, the light beam of a constant wavelength cannot be focused properly.

In order to resolve the above-mentioned drawback, in the present embodiment, the substrate bearing the reflective one-dimensional blazed diffraction grating 40 is formed as a cylindrical shape with the center at the exit pupil of the imaging optical system, in consideration of the emerging angle $\alpha'$ in the main scanning plane (finite field angle), whereby the principal rays corresponding to different emerging field angles always perpendicularly enter the diffraction grating 40. In this manner the shift in blazed wavelength, dependent on the incident angle in said main scanning plane is effectively prevented.

On the other hand, the optical path length from said diffraction grating 40 to the 3-line sensor 4 is $L_0 = g - R$ in the axial position ($\alpha' = 0$) but $L_1 = g/\cos\alpha' - R$ in an off-axis position ($\alpha' = 0$). Thus the optical path length is not constant, in a similar manner as indicated by the equation (4), so that the reflectively diffracted lights are not properly focused on the photosensors.

Figure 14:
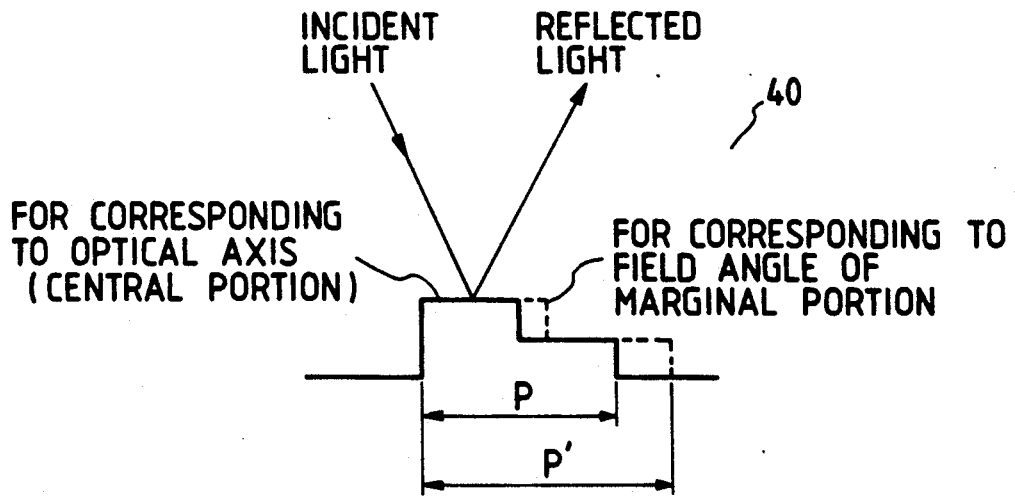
FIG. 14 is a schematic view of the diffraction grating of the second embodiment of the present invention.

In order to avoid this drawback, the pitch P of said diffraction grating 40 is continuously decreased from the upper side to the lower side in the sub-scanning plane as in the first embodiment, and symmetrically increased from the axial position to the off-axis position as shown in FIG. 14 (P to P' in FIG. 14).

In this manner the 1st order diffraction angle is varied to achieve proper focusing on parallel linear sensor arrays, from the axial position to the off-axis position.

As explained in the foregoing, in the present embodiment, the reflective one-dimensional blazed diffraction grating 40 is cylindrically shaped, and the grating pitch is suitably modified as explained above, whereby the color separation can be properly executed and the color image information can be precisely read for even color, each though an ordinary optical system is employed as the imaging optical system.

Figure 15:
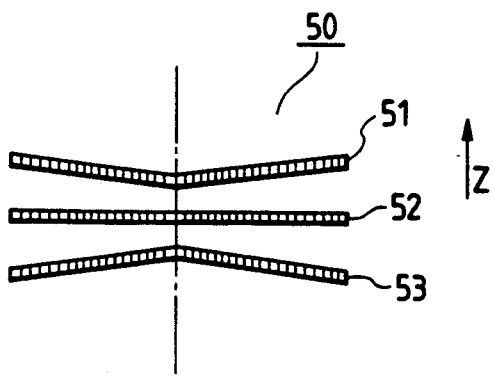
FIG. 15 is a schematic view of photosensor means in the optical system of a third embodiment of the color image reading apparatus of the present invention.

FIG. 15 is a schematic view of the photosensor means 50 in a third embodiment of the image reading apparatus of the present invention. In contrast to the foregoing second embodiment in which the diffraction grating 40 is cylindrically formed in the main scanning plane, the present embodiment employs a monolithic 3-line sensor 50 as a light receiving means in which both line sensors 51, 53 sandwiching a center line 52 are positioned in a non-parallel manner, as shown in FIG. 15. In this case the diffraction grating substrate remains flat, and the shift in the Z-direction, represented by the equation (4) is absorbed by the positional shifts of the pixels forming the line sensor arrays. Also in this case, the grating pitch P of said diffraction grating 40 is continuously varied in the direction of pitch (Z-direction), as in the first embodiment.

Figure 16:
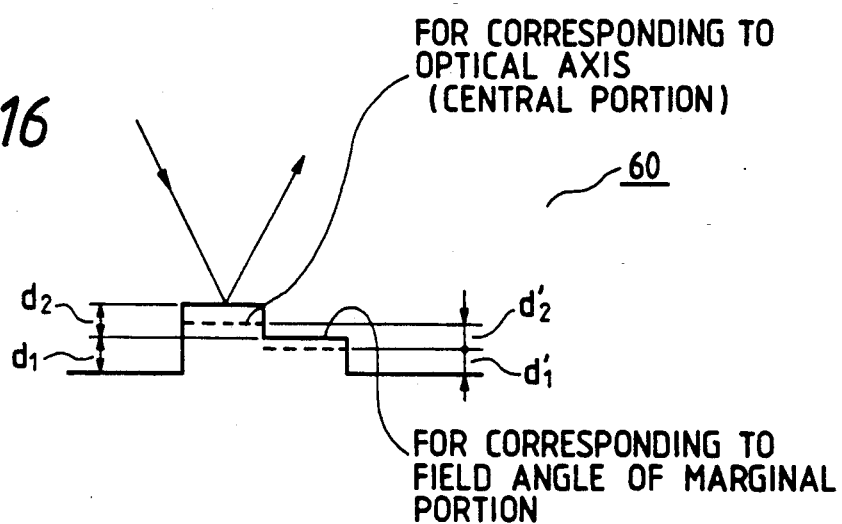
FIG. 16 is a schematic view of the diffraction grating of the third embodiment of the present invention.

On the other hand, the shift of the blazed wavelength depending on the incident angle $\alpha'$, resulting from the flat structure of the diffraction grating, is resolved, as shown in FIG. 16, by continuously increasing the grating thickness in the main scanning sectional direction of the diffraction grating 60, with a same ratio for each step, from the axial position toward the off-axis position (from a center portion to a peripheral portion).

In a specific numeral example, in use of the diffraction grating of the first embodiment, the brazed wavelength $\lambda_0$ is maintained at a constant value of 530 nm by employing a grating thickness $d_1 = 797.6$ nm for an incident angle $\alpha' = 20°$ in contrast to a grating thickness $d_1 = 749.5$ nm for an incident angle $\alpha' = 0$.

Figure 17:
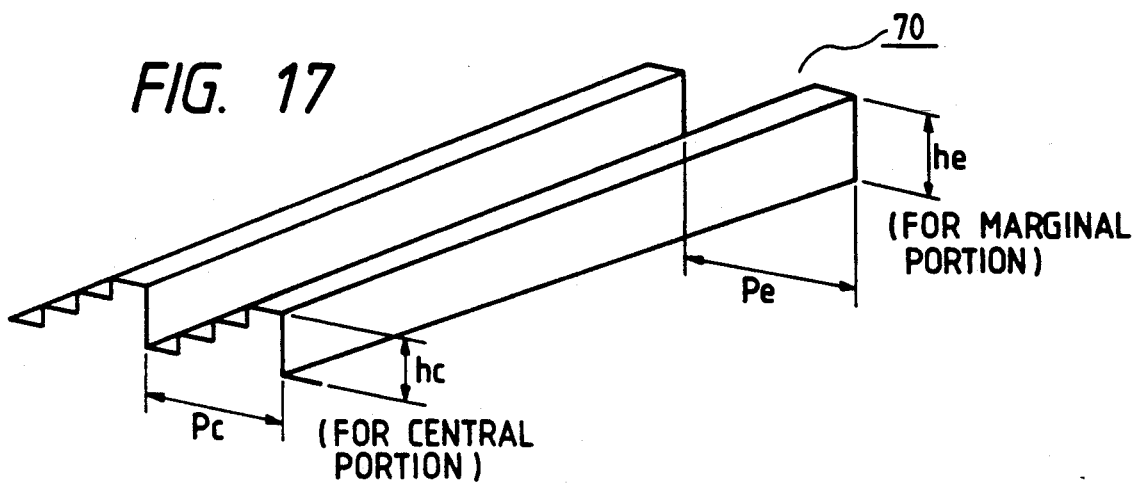
FIG. 17 is a perspective view of the diffraction grating in the optical system of a fourth embodiment of the color image reading apparatus of the present invention.

FIG. 17 is a schematic view of the reflective one-dimensional blazed diffraction grating 70 employed as the color separation means in a fourth embodiment of the image reading apparatus of the present invention.

The reflective diffraction grating 70 of the present embodiment has a three-dimensional structure, in which the grating pitch P is gradually increased in the direction of the main scanning cross-section from the center of the optical axis to the outside (Pc to Pe), and is continuously decreased in the direction of the sub-scanning cross-section from the upper side to the lower side in a similar manner as in the first embodiment.

In this manner the aberration in the diffracted focus position on the photosensor and the generation of blur of the $\pm$1st-order diffracted light in the direction of the sub scanning cross-section are prevented. Also the grating thickness is continuously increased from the axial position toward the off-axis position (from hc at center to he at peripheral part) as in the third embodiment to effectively prevent the shift of the blazed wavelength depending on the image angle $\alpha'$.

Thus a color image reading device without a telecentric imaging optical system can be realized by a reflective diffraction grating 70 having a three-dimensional structure formed on a flat substrate.

In the foregoing embodiments the variations in the grating pitch and in the grating thickness are assumed to be continuous, but similar effects can be attained by making said variations, for example, in a plurality of steps.

As explained in the foregoing, the present invention can provide a color image reading apparatus capable of reading color image with a high precision, with color separation means comprising a reflective one-dimensional blazed diffraction grating and photosensor means comprising a monolithic 3-line sensor, by suitably modifying the grating pitch of said diffraction grating, thereby effectively eliminating the blur of ±1st-order diffracted light in the sub-scanning direction, caused by the aberration in the reflective diffraction angle resulting from the difference in the incident angle, into said diffraction grating, of the converging spherical wave emerging from the imaging optical system.

Also there is provided a color image reading apparatus capable of employing a non-telecentric ordinary imaging optical system, by the use of a reflective diffraction grating with a three-dimensional structure.

In the foregoing embodiments the image blur on the photosensor, caused by the aberration in the reflective diffraction angle, resulting from the difference in the incident angle, is prevented by the variation in the pitch of the diffraction grating. In the following there will be explained embodiments capable of preventing said image blur without the change in the grating pitch.

Figure 18A:
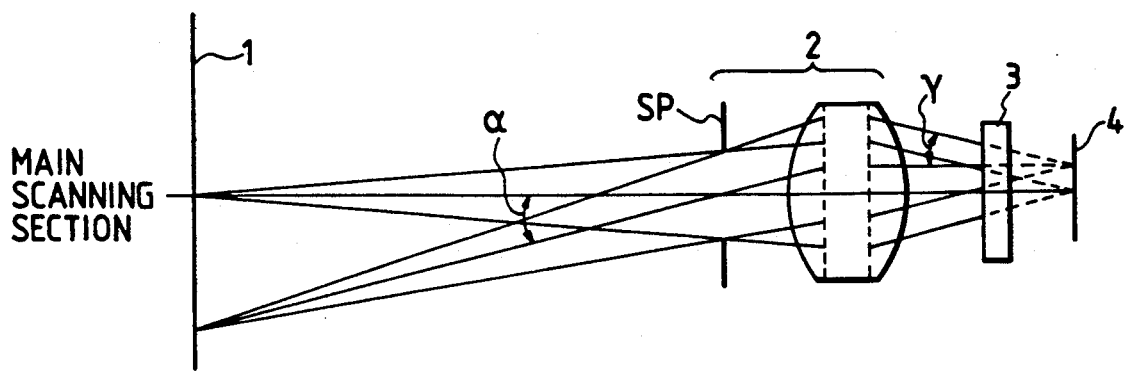
FIGS. 18A and 18B are respectively a plan view and a lateral view of the optical system in a fifth embodiment of the color image reading apparatus of the present invention.
Figure 18B:
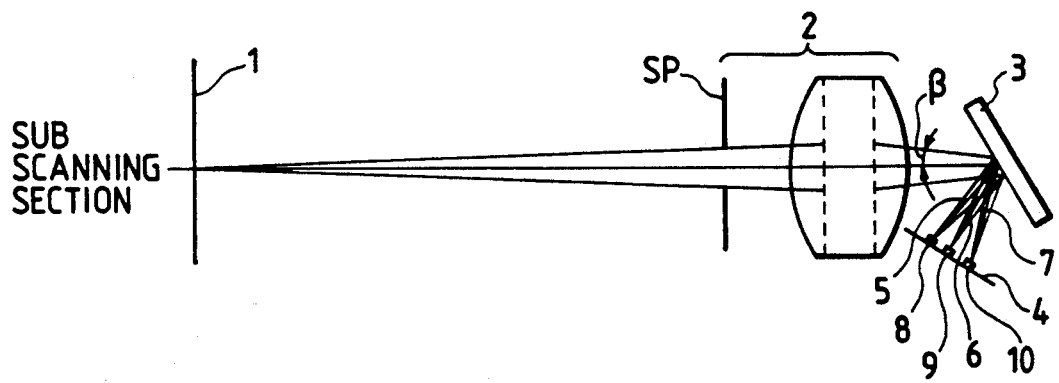
Figure 19:
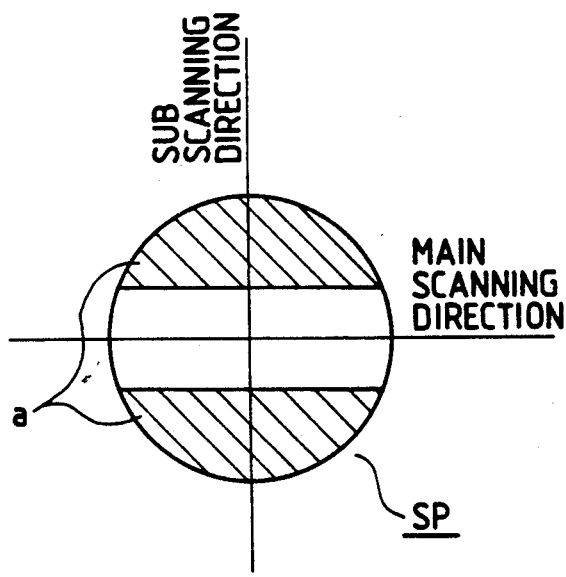
FIG. 19 is an elevation view of a diagram shown in FIG. 18.

FIGS. 18A and 18B are respectively a schematic plan view in the main scanning direction and a schematic lateral view in the sub-scanning direction of the optical system of a 5th embodiment of the color image reading apparatus of the present invention, and FIG. 19 is an elevation view of a diaphragm SP shown in FIGS. 18A and 18B. As the basic configuration of the apparatus is similar to that shown in FIGS. 5A and 5B, the components equivalent in function to those in FIGS. 5A are represented by same numerals and will not be explained further.

The paths of the light beams after passing the imaging optical system are similar to those shown in FIG. 6.

In these drawings, an original image plane 1 bears a color image. Light amount control means SP comprises of a diaphragm and controls the amount of passing light in such a manner that the numerical aperture (N.A.) in the sub-scanning direction, perpendicular to the main scanning direction, becomes smaller than the numerical aperture (N.A.) in said main scanning direction.

As shown in FIG. 19, the diaphragm SP of the present embodiment is so constructed that the aperture diameter in the direction of array of pixels of the line sensors (main scanning direction) is larger than that in the sub-scanning direction.

An imaging optical system 2 is constructed, in the present embodiment, as so-called exit telecentric system, in which the principal rays emerge at the exit side parallel to the optical axis, and serves to focus the light beams from the color image onto photosensor means (monolithic 3-line sensor) through a reflective one-dimensional blazed diffraction grating to be explained later.

Color separation means 3, comprising a reflective one-dimensional blazed diffraction grating, separates the incident light beams into lights of predetermined colors, for example three elementary colors of red (R), green (G) and blue (B), by reflective diffraction in a direction perpendicular to the direction of array of pixels of the line sensors. The pitch of said diffraction grating is maintained constant in the direction of pitch.

Photosensor means 4 comprises of so-called monolithic 3-line sensor in which three line sensors (CCD's) 8, 9, 10 are formed on a same substrate in a mutually parallel manner. The distances among said line sensors 8, 9, 10 are selected differently, corresponding to the directions of color separation of the color separation means 2.

In the present embodiment, the color image on the original image plane 1 is line scanned by scanning means comprising for example an unrepresented scanning mirror, and the passing light quantity of the light beam from said color image is controlled by the diaphragm SP, then converged by the imaging optical system 2, and separated by the one-dimensional blazed diffraction grating 3 into three color light beams, which are respectively focused on the line sensors 8, 9, 10, whereby the photosensor means 4 digitally reads the color images corresponding to said color lights.

The reflective one-dimensional blazed diffraction grating 3, used for color separation in the present embodiment, separates, as shown in FIG. 6, the incident light beam into a −1st-order light 5, a 0th-order light 6 and a ±1st-order light 7 in three directions, and focuses these lights of a converging spherical wave respectively onto the photosensors 8, 9, 10.

In general, for reading color image information with high precision by a color image reading apparatus, the image blur shown in FIGS. 9 and 11 cannot be tolerated as it deteriorates the resolving power in the sub-scanning direction.

If said blur is in the order of 80 μm for the ±1st-order light and 60 μm for the −1st-order light as explained before, such blur is totally unacceptable because the pixels constituting the line sensors are generally sized in the order of 10×10 μm.

Also the amount of blur for the ±1st-order light in the sub-scanning direction can be represented as follows, based on geometrical optics which has been proven to provide the approximately correct amount of blur as explained before:

$$X' = \frac{L_0}{\pm\tan\beta \cdot \tan\theta_0 - 1} \cdot \left[\tan\left[\sin^{-1}\left(\sin(\theta_0 \pm \beta) + \frac{\lambda+1}{P}\right) - (\theta \pm \beta)\right]\right] \quad (5)$$

sign +: upper side
sign −: lower side and the amount of blur $\Delta X'_{+1}$ can be determined as the difference of the values of the equation (5) respectively corresponding to different signs.

Also for the −1st-order light, there stands:

$$X' = \frac{L_0}{\pm\tan\beta \cdot \tan\theta_0 - 1} \cdot \left[\tan\left[\sin^{-1}\left(\sin(\theta_0 \pm \beta) + \frac{\lambda-1}{P}\right) - (\theta \pm \beta)\right]\right] \quad (5')$$

and the amount of blur $\Delta X'_{-1}$ can be determined as the difference of the values of the equation (5') respectively corresponding to different signs.

On the other hand, the numerical apertures in the main and sub-scanning directions are respectively represented by sin γ, sinβ wherein γ and β are converting angles of the converging spherical wave respectively in the main and sub-scanning directions.

As will be apparent from the equations (5) and (5′), the amount of blur ΔX′ can be suppressed by reducing the converging angle β in the sub-scanning direction.

The illumination intensity on the photosensor, corresponding to the required amount of light received thereby, is proportional to the square of the numerical aperture at the converging side. Consequently, a required amount of light may not be obtained if the converging angle β in the sub-scanning direction is simply reduced in the designing of the color image reading apparatus.

In the present embodiment, therefore, the required amount of light is obtained by selecting the numerical aperture in the main scanning direction larger than that in the sub-scanning direction, and high precision color image reading is enabled by selecting the converting angle β in such a manner that the amount of blurs for the ±1st-order lights on the photosensor remains is in the tolerable range.

More specifically, in the present embodiment, a diaphragm SP having predetermined shape is provided as the light amount correcting means in front of the imaging optical system 2, thereby controlling the amount of light passing in such a manner that the numerical aperture in the sub-scanning direction becomes smaller than that in the main scanning direction, thus maintaining β at a low value.

The diaphragm SP has a rectangular aperture, as indicated by a hatched area α (light intercepting portion) in FIG. 19, which is made longer in the main scanning direction, whereby the amount of passing light is made larger in the main scanning direction than in the sub-scanning direction.

Figure 20:
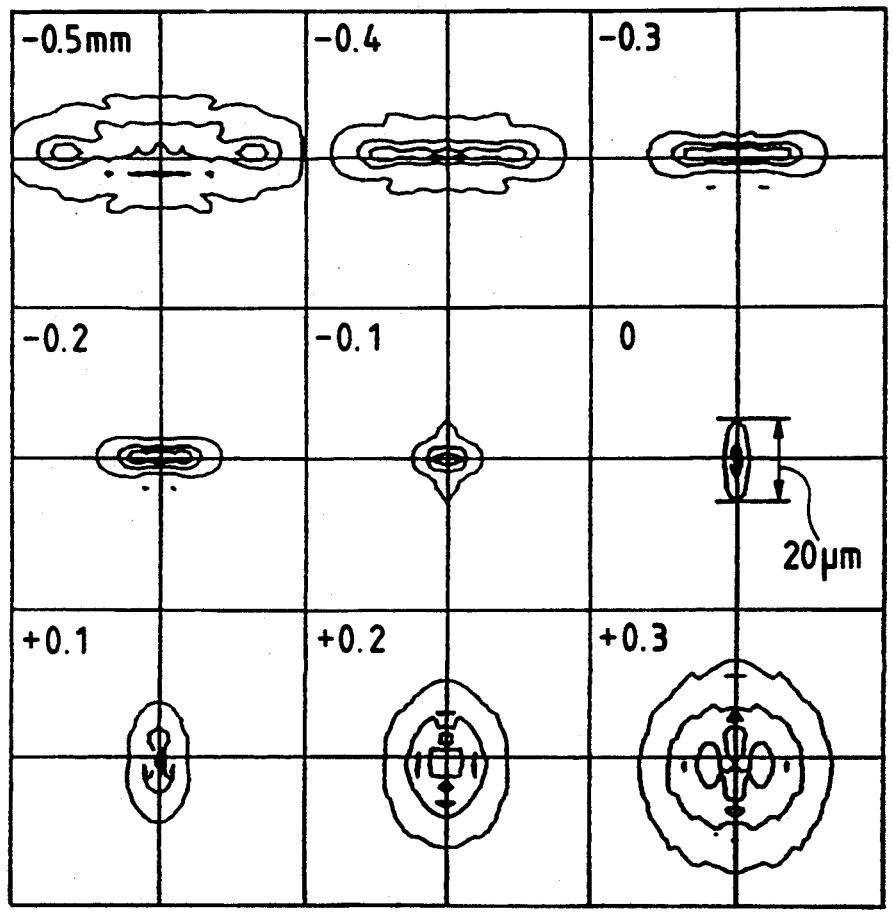
FIG. 20 is a view showing the diffraction pattern of a +1st order light in the fifth embodiment.
Figure 21:
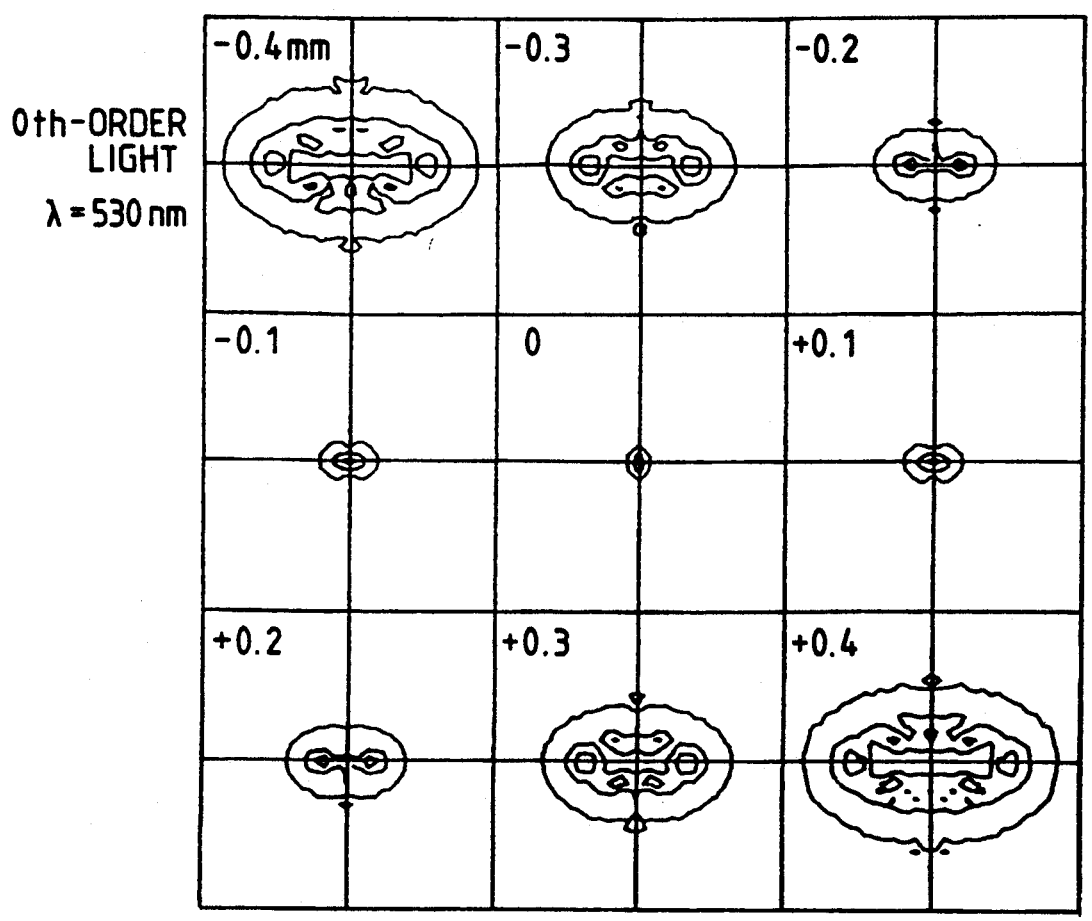
FIG. 21 is a view showing the diffraction pattern of a 0th order light in the fifth embodiment.
Figure 22:
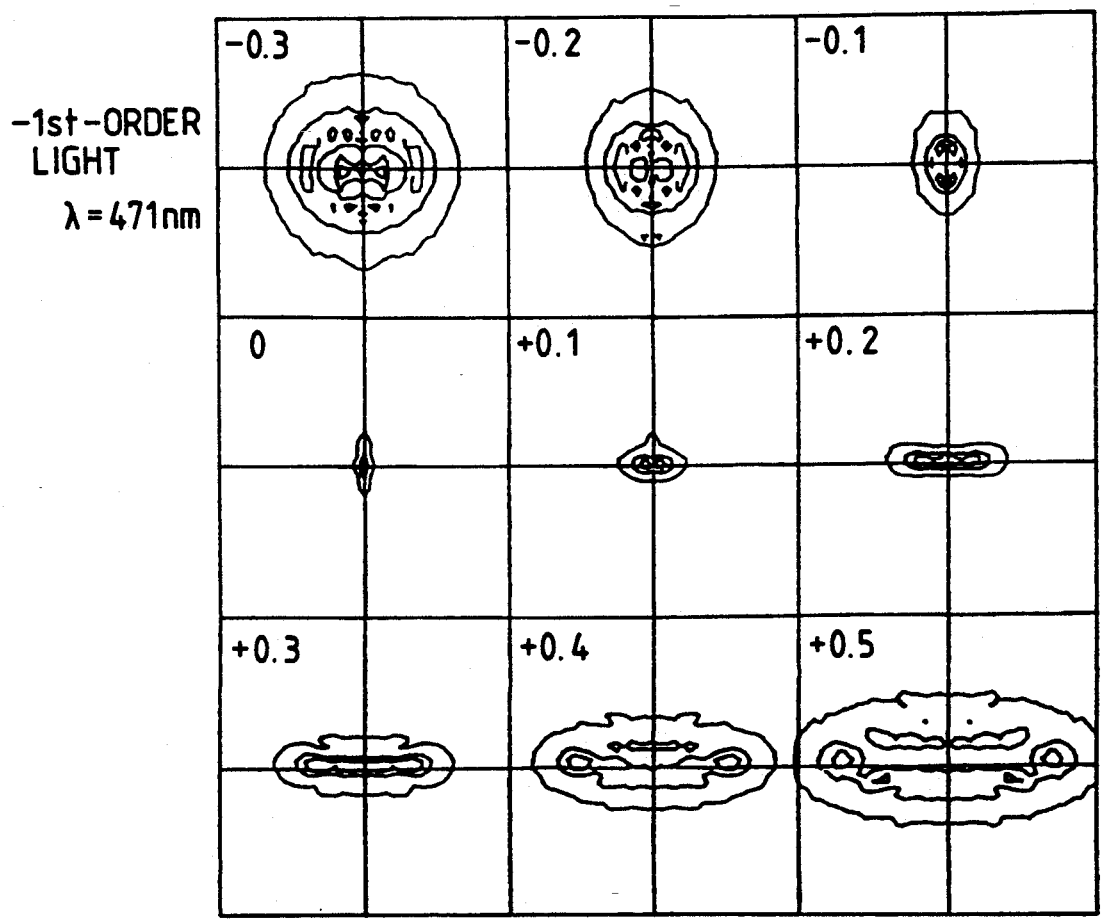
FIG. 22 is a view showing the diffraction pattern of a $-$1st order light in the fifth embodiment.

By means of the diaphragm SP of the above-mentioned shape, the converging angle β in the sub-scanning direction is reduced for example to 3.0°, while the converting angle γ in the main scanning direction is maintained at 5.5°. The point image intensity distribution in this state is shown in FIGS. 20 to 22.

As will be apparent from these charts, the amount of blur of the ±1st-order light is about 20 μm at a level of 10 of the peak intensity, and such blur is sufficiently tolerable in consideration of the signal blunting resulting in the scanning operation of the photosensor, due to a certain aperture in the sub-scanning direction.

On the other hand, in relation to the lower limit of the converging angle β in the sub-scanning direction, the following relation among the numerical aperture of the imaging optical system 2, the wavelength γ and the limit of diffraction is as follows:

$$\phi_A \simeq 1.64 \lambda \times \tfrac{1}{NA} \quad (6)$$

wherein NA = sinβ, and $\phi_A$ is the diameter of diffraction spot.

According to said equation (6), for example for a wavelength $\lambda_{+1}$ of the +1st-order light of 606 nm and a diffraction spot diameter $\phi_A$ of ca. 10 μm (equal to the pixel size), the NA has to be 0.05 or larger. Consequently, the image blur resulting from the numerical aperture of the imaging optical system cannot be maintained within the tolerable level unless the converging angle θ is maintained at about 2.8° or larger.

In the present embodiment, the incident angle $\theta_0$ the axial ray is selected at 30°, since the image blur on the photosensor is also dependent on said incident angle as indicated by the equation (5).

The above-mentioned figures are selected because perpendicular incidence is difficult to achieve due to mechanical interference etc. when a reflective one-dimensional blazed diffraction grating is employed as the color separation means.

Also in the present embodiment, a slit of a predetermined shape is provided as the light amount correcting means at an arbitrary position between the color image (original image plane) and the photosensor means, so that the amount of passing light is controlled in such a manner that the numerical aperture in the sub-scanning direction becomes smaller than that in the main scanning direction, whereby the blur of the ±1st-order lights on the photosensor in the direction perpendicular to the direction of pitch of the diffraction grating is maintained within the signal blunting in the photosensor, resulting from the finite aperture in the sub-scanning direction.

In this manner, effects similar to those in the foregoing embodiments can be attained by forming the slit such that the amount of passing light becomes larger in the main scanning direction than in the sub-scanning direction.

In the present invention, the above-mentioned slit may also be positioned in front of or inside the imaging optical system, or in the optical path between the reflective one-dimensional blazed diffraction grating, and the imaging optical system, or on the surface of said diffraction grating.

Furthermore, the light amount correcting means may be composed of any optical member that can control the amount of passing light in such a manner that the numerical aperture becomes smaller in the sub-scanning direction than in the main scanning direction.

As explained in the foregoing, the present invention can provide a color image reading apparatus capable of reading a color image with high precision, in which apparatus in reading a color image by a photosensor means comprising a monolithic three-line sensor through a reflective type one-dimensional blazed diffraction grating as color separation means, since there is provided, between the color image and the photosensor means, light amount correcting means for limiting the amount of passing light in such a manner that the numerical aperture of the imaging optical system becomes smaller in the sub-scanning direction than in the main scanning direction, thereby maintaining the image blur of the ±1st-order lights in the sub-scanning direction, caused by the aberration in the reflective diffraction angle resulting from the difference in the incident angle, to said diffraction grating, of the converging spherical wave emerging from said imaging optical system, within the signal blunting in the photosensor means, resulting from the finite aperture in the sub-scanning direction thereof, whereby the resolving power in the sub-scanning direction is maintained at a high level.

What is claimed is:

1. An image reading apparatus comprising:
   a plural-line sensor including a plurality of one-dimensional sensor arrays disposed on a common substrate;
   an imaging optical system for focusing an image of an object on said plural-line sensor; and a reflective blazed diffraction grating, positioned between said imaging optical system and said plural-line sensor, for separating light from the object into a plurality of colors;

wherein a pitch of said diffraction grating varies in a direction of the pitch.

2. An image reading apparatus according to claim 1, wherein the pitch of said diffraction grating varies continuously in the direction of the pitch.

3. An image reading apparatus according to claim 1, wherein the pitch of said diffraction grating varies continuously in the direction of the pitch relative to an incident angle of a light beam entering said diffraction grating.

4. An image reading apparatus according to claim 1, wherein the pitch of said diffraction grating varies continuously from a first end of said diffraction grating to a second end of said diffraction grating in the direction of the pitch.

5. An image reading apparatus according to claim 1, wherein said plurality of one-dimensional sensor arrays are separated by finite distances in a direction perpendicular to a direction of said plurality of one-dimensional sensor arrays.

6. An image reading apparatus according to claim 1, wherein said reflective blazed diffraction grating separates light from the object into the plurality of colors in a direction perpendicular to a direction of said plurality of one-dimensional sensor arrays.

7. An image apparatus according to claim 1, wherein the object is scanned in a sub-scanning direction which is perpendicular to a direction of said plurality of one-dimensional sensor arrays.

8. An image reading apparatus according to claim 1, wherein said reflective blazed diffraction grating comprises a one-dimensional blazed diffraction grating.

9. An image reading apparatus according to claim 1, wherein said imaging optical system comprises an exit telecentric optical system.

10. An image reading apparatus according to claim 1, wherein the pitch of said reflective blazed diffraction grating increases in succession from an optical axis center of said imaging optical system toward a peripheral field angle position of said imaging optical system.

11. An image reading apparatus according to claim 1, wherein a thickness of said reflective blazed diffraction grating increases in succession from an optical axis center of said imaging optical system toward a peripheral field angle position of said imaging optical system.

12. An image reading apparatus comprising:

a plural-line sensor including a plurality of one-dimensional sensor arrays disposed on a common substrate;

an imaging optical system for focusing an image of an object on said plural-line sensor;

a reflective blazed diffraction grating, positioned between said imaging optical system and said plural-line sensor, for separating light from the object into a plurality of colors; and light amount correcting means, positioned in an optical path between the object and said plural-line sensor, for limiting an amount of passing light such that a first numerical aperture in a sub-scanning direction becomes smaller than a second numerical aperture in a main scanning direction.

* * * * *

UNITED STATES PATENT AND TRADEMARK OFFICE
CERTIFICATE OF CORRECTION

PATENT NO. : 5,221,835
DATED : June 22, 1993
INVENTOR(S) : MICHITAKA SETANI

It is certified that error appears in the above-indentified patent and that said Letters Patent is hereby corrected as shown below:

ON THE TITLE PAGE:
[54] IN THE TITLE

"IMAGE READING APPARATUS HAVING A REFLECTIVE BLAZED DIFFRACTION GRATING WITH VARIED PITCH" should read --IMAGE READING APPARATUS WITH VARIABLE BLAZED DIFFRACTION GRATING--.

COLUMN 1

Line 43, "oh" should read --on--.
Line 57, "is" should read --are--.

COLUMN 2

Line 1, "2√2t," should read --$2\sqrt{2t}$,--.

COLUMN 4

Line 8, "± 1st order light;" should read --+ 1st order light;--.

COLUMN 5

Line 53, "± 1st order light" should read --+ 1st order light--.

UNITED STATES PATENT AND TRADEMARK OFFICE
CERTIFICATE OF CORRECTION

PATENT NO. : 5,221,835
DATED : June 22, 1993
INVENTOR(S) : MICHITAKA SETANI

It is certified that error appears in the above-indentified patent and that said Letters Patent is hereby corrected as shown below:

COLUMN 6

Line 12, "± 1st order" should read --+ 1st order--.
Line 38, "± 1st order" should read --+ 1st order--.
Line 51, "± 1st order" should read --+ 1st order--; and, "converse" should read --converges--.
Line 54, "light" should read --lights--.

COLUMN 7

Line 46, "± 1st order" should read --+ 1st order--.

COLUMN 8

Line 8, "± 1st order" should read --+ 1st order--.

UNITED STATES PATENT AND TRADEMARK OFFICE
CERTIFICATE OF CORRECTION

PATENT NO. : 5,221,835
DATED : June 22, 1993
INVENTOR(S) : MICHITAKA SETANI

Page 3 of 4

It is certified that error appears in the above-indentified patent and that said Letters Patent is hereby corrected as shown below:

COLUMN 9

Line 28, "off-axis)" should read --off-axis).--.
Line 34, "($\pm\lambda$/p+sin$\theta$-0}     (4)" should read --($\pm\lambda$/p+sin$\theta$-$\theta$}     (4)"--.
Line 36, "sing" should read --sign--; and, "$\pm$ 1st order," should read --+ 1st order,--.
Line 61, "($\alpha'$=0), should read --($\alpha'\neq$0).--.

COLUMN 12

Line 4, "of" should read --a--.
Line 26, "$\pm$ 1st order" should read --+ 1st order--.
Line 34, "$\pm$ 1st order" should read --+ 1st order--.
Line 39, "$\pm$ 1st order" should read --+ 1st order--.
Equation 5', "($\theta \pm \beta$)]" should read --($\theta$o $\pm \beta$)]--.

UNITED STATES PATENT AND TRADEMARK OFFICE
CERTIFICATE OF CORRECTION

PATENT NO. : 5,221,835
DATED : June 22, 1993
INVENTOR(S) : MICHITAKA SETANI

It is certified that error appears in the above-indentified patent and that said Letters Patent is hereby corrected as shown below:

COLUMN 13

Line 22, "blurs" should read --blur--.
Equation 6, "$\phi_A \approx 1.64 \lambda x \frac{1}{2} NA \quad (6)$" should read --$\phi_A \approx 1.64 x \lambda x \frac{1}{2} NA \quad (6)$--.

COLUMN 15

Line 12, "pitch" should read --pitch,--.
Line 30, "image apparatus" should read --image reading apparatus--.

Signed and Sealed this

Twenty-third Day of November, 1993

BRUCE LEHMAN

Attest:

Attesting Officer     Commissioner of Patents and Trademarks